No. 846,869. PATENTED MAR. 12, 1907.
A. V. SNOW.
TREE FELLING MACHINE.
APPLICATION FILED MAR. 17, 1906.

Witnesses
T. K. Mocran
James F. Crown

Inventor
A. V. Snow
By Geo. S. Vashon
Attorney

UNITED STATES PATENT OFFICE.

ASA V. SNOW, OF WORCESTER, MASSACHUSETTS.

TREE-FELLING MACHINE.

No. 846,869.　　　　　Specification of Letters Patent.　　　Patented March 12, 1907.

Application filed March 17, 1906. Serial No. 306,569.

*To all whom it may concern:*

Be it known that I, ASA V. SNOW, a citizen of the United States, residing at Worcester, in the county of Worcester and State of Massachusetts, have invented new and useful Improvements in Tree-Felling Machines, of which the following is a specification.

This invention relates to a tree-felling machine of the portable type and embodying an endless or chain saw supported in horizontal position by an extension-bar, which is adjustable or movable on an upright and actuated by suitable motive means.

The object of the invention is to provide simple, durable, and economic tree-felling means which will perform its work more rapidly and effectively than the ordinary saw, and thereby facilitate the felling of trees, and to which power may be applied either through belting or by means of an electric motor operated from the running parts of an ordinary sawmill.

The invention will be more fully hereinafter set forth in detail, reference being had to the accompanying drawings, wherein—

Figure 1:
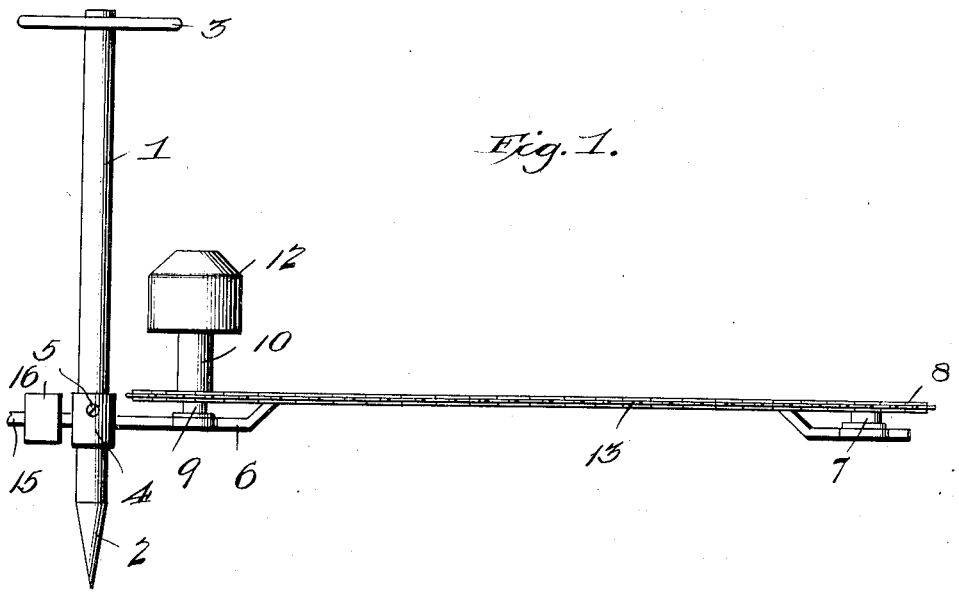
Figure 2:
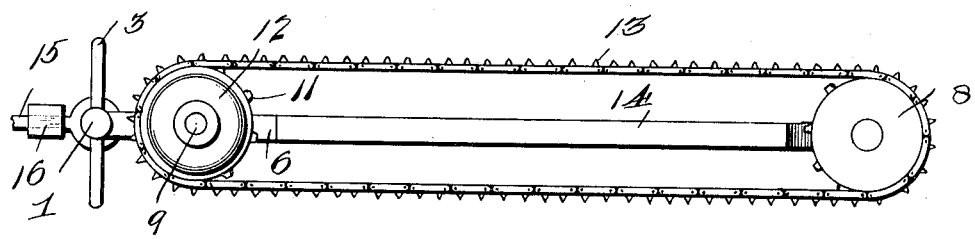
Figure 3:
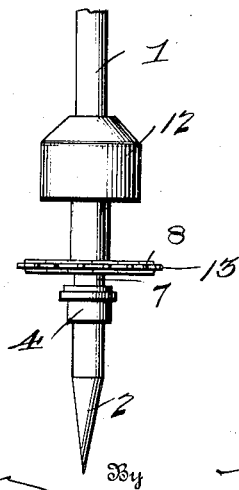

Figure 1 is a side elevation of a tree-felling machine embodying the features of the invention. Fig. 2 is a top plan view of the same. Fig. 3 is an end elevation thereof.

Similar numerals of reference are employed to indicate corresponding parts throughout the several views.

The numeral 1 designates an upright of any suitable length and provided with a lower pointed end 2 to adapt it to be thrust firmly into the ground. The upright 1 has an upper handle or grip 3 to facilitate placement thereof. On the upright 1 a sleeve 4 is adapted to be rotated and also vertically adjusted and is preferably provided with a set-screw 5 for holding it at a desired elevation. Projecting outwardly from the said sleeve is a bar or support 6, from the outer end of which rises a vertical stub-shaft 7, on which is rotatably disposed a sprocket-wheel 8. On the bar or support 6, adjacent to the upright 1, a stub-shaft 9 also projects upwardly, and thereover is applied a sleeve or analogous rotating device 10, to which is attached a sprocket-wheel 11, the sleeve being preferably operated by an electric motor 12, receiving its current from a suitable generating medium operated at a distance by the movable parts of a sawmill or by any other motive power. Traversing or surrounding the sprocket-wheels 8 and 11 is an endless or chain saw 13, having teeth at regular intervals of any preferred form. The intermediate portion of the bar or support 6 is struck upwardly in a plane coincident with the plane of the saw 13 to form a guide 14, which moves through the saw-kerf or regularly follows the cutting or active portion of the saw to keep the saw in proper position with respect to the tree being cut and also to hold the several parts carried by the bar or support in such manner as to resist strain thereof during the operation of the saw. The bar or support 6 also has one extremity 15 projected outwardly beyond the sleeve 4 and provided with a counterbalancing-weight 16, which also overcomes any tendency of the devices carried by the bar or support from misshaping or depressing the latter.

In the operation of the device the upright 1, which is preferably formed of steel or some other hard metal, is forced into the ground adjacent to the lower portion of the trunk of the tree adapted to be felled, and the bar or support 6 is swung around until the adjacent portion of the saw 13 contacts with the tree. The motor 12 is then set in operation by the medium of a switch, which may be suitably located thereon or on some part of the upright 1, if desired, and as the saw progresses the bar or support will be moved gradually to compensate for the depth of the kerf formed by the saw, the necessary pivot action of the mechanism being obtained through the movement of the upright 1 in the ground and in view of the fact that the collar 4 is secured to said upright by the set-screw 5, and this operation will be continued until the tree is cut through, when the motor will be stopped and the movement of the saw consequently checked. The felling-machine may then be quickly disengaged from position adjacent to the stump and moved to another point in operative relation to another tree. The tree in falling will be guided in the usual manner, so as to avoid injury to the machine.

The improved device will be found exceptionally convenient, and instead of motive power for driving the endless or chain saw hand-power can be substituted, as in some uses it may not be practicable to connect the machine with any motive power in view of possible distance from the latter. It is also intended to use this machine in some instances to cut up trunks or logs and to dispose the same so that the sprocket-wheels will be arranged vertically. This change of position can be readily effected without in the least modifying the invention, and in such change of position the upright 1 can be held by stakes or other suitable means. In the vertical disposition of the sprocket-wheel 6, as just set forth, the endless or chain saw would cut downwardly. Any preferred form of chain saw may be used; but for ordinary purposes it has been found that what is known as a "bicycle-chain," having suitable teeth secured thereto, is preferable.

What I claim is—

1. In a tree-felling machine, the combination of an upright, a support vertically movable on the upright, an endless or chain saw carried by the said support, means for operating the saw, and a counterbalancing-weight secured to the support on the opposite side of the upright from the saw and remaining mechanism.

2. In a tree-felling machine, the combination of an upright having a pointed end, a support movably held by the upright, an endless or chain saw disposed on the support, the latter having a portion thereof extending longitudinally between the parallel portions of the saw and in the same plane as the latter to form a guide, mechanism for operating the saw, and a counterbalancing-weight engaging a part of the support on the opposite side of the upright from the saw and remaining mechanism, the upright forming a pivotal means for the remaining mechanism.

In testimony whereof I affix my signature in presence of two witnesses.

ASA V. SNOW

Witnesses:
SAMUEL H. LONGLEY,
CAROLINE L. THOMPSON.